(No Model.) 4 Sheets—Sheet 3.
J. P. ODGERS.
FEEDING DEVICE FOR CARD PUNCHING PRESSES.
No. 482,981. Patented Sept. 20, 1892.
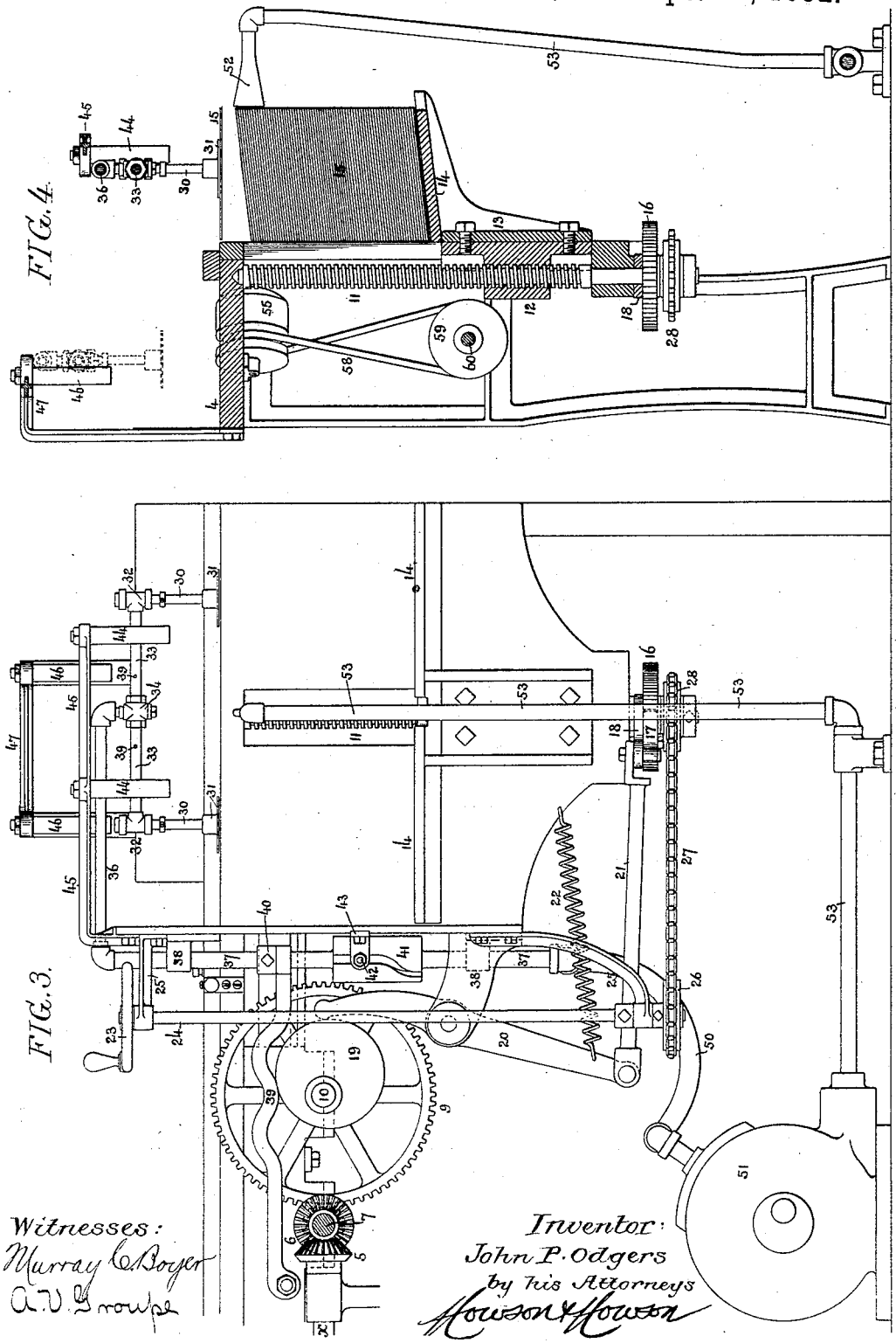
Witnesses:
Murray C. Boyer
A. V. Groupe
Inventor:
John P. Odgers
by his Attorneys
Howson & Howson (No Model.) 4 Sheets—Sheet 4.
J. P. ODGERS.
FEEDING DEVICE FOR CARD PUNCHING PRESSES.
No. 482,981. Patented Sept. 20, 1892.
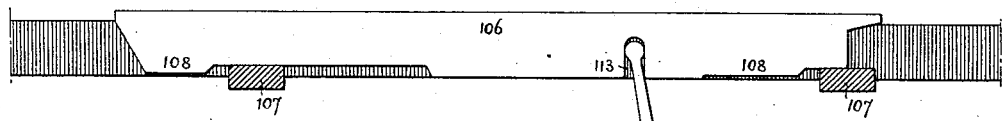
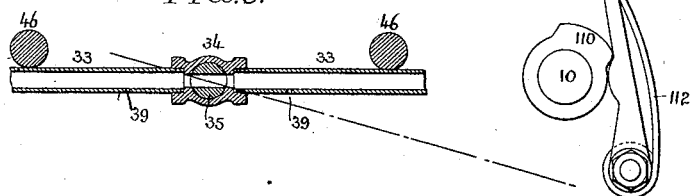
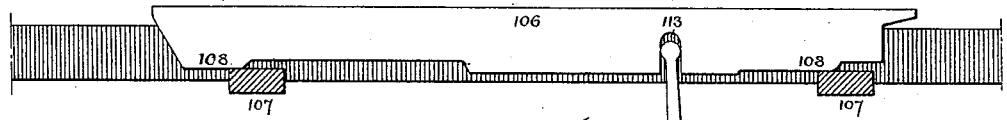
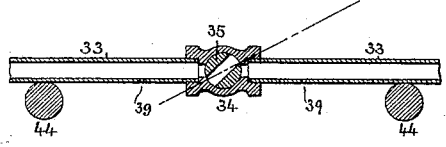
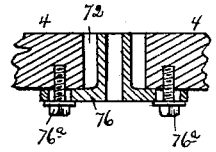
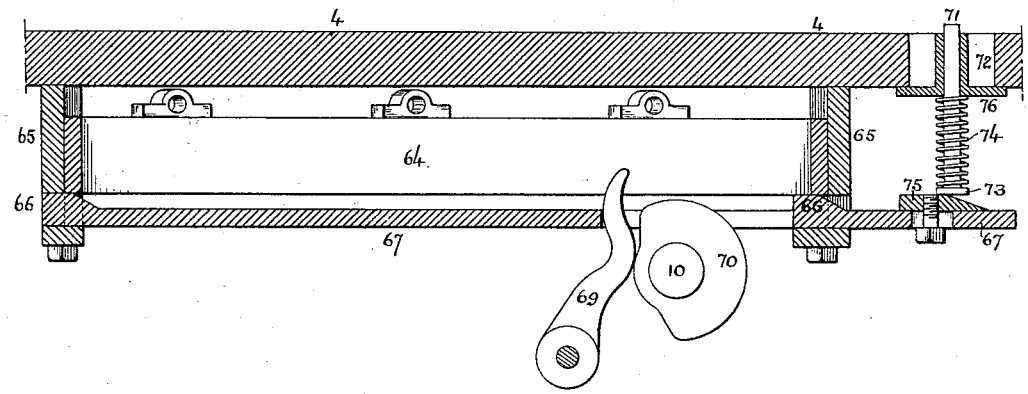
Witnesses:
Murray C Boyer
A. V. Groupe
Inventor:
John P. Odgers
by his Attorneys
Howson & Howson

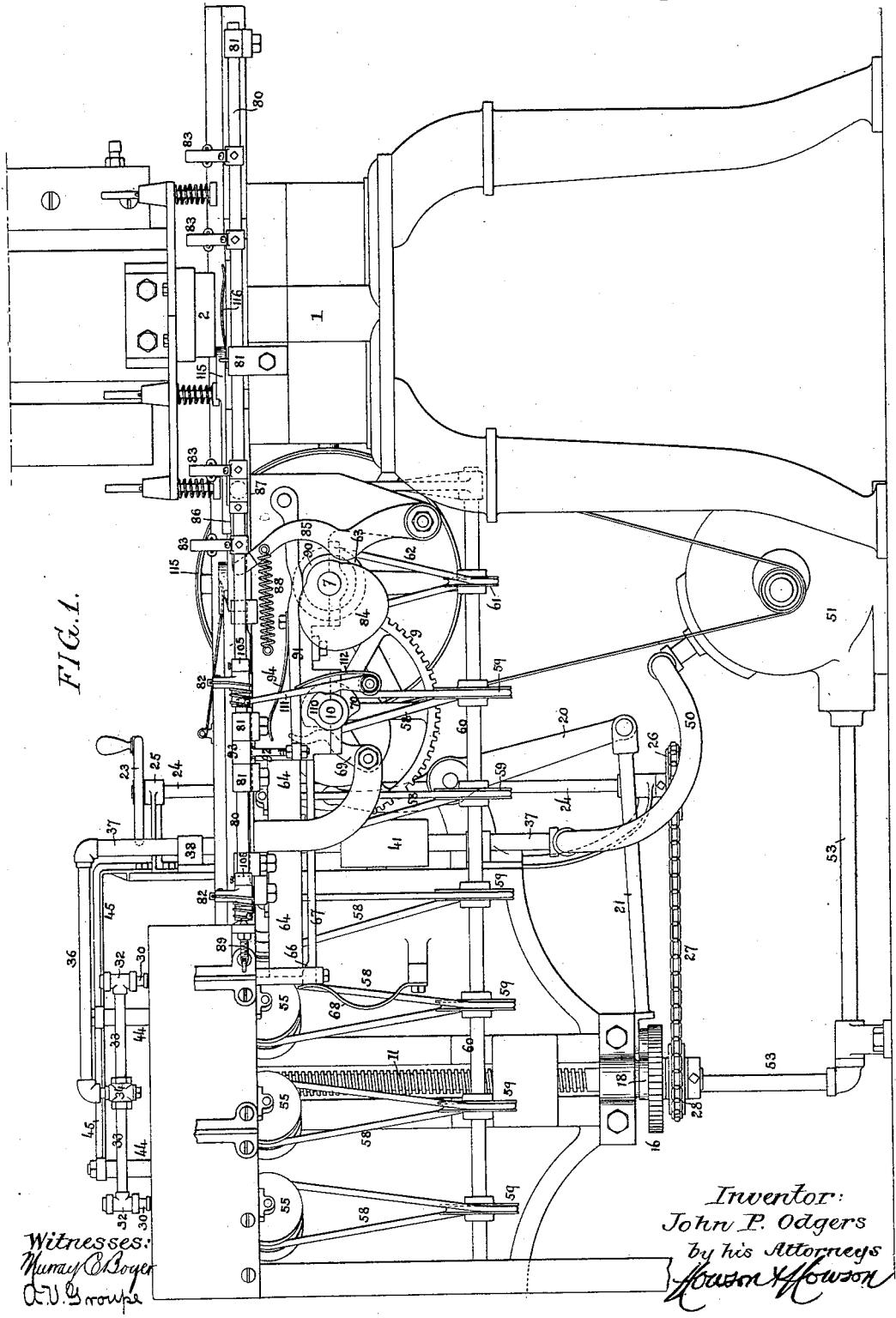

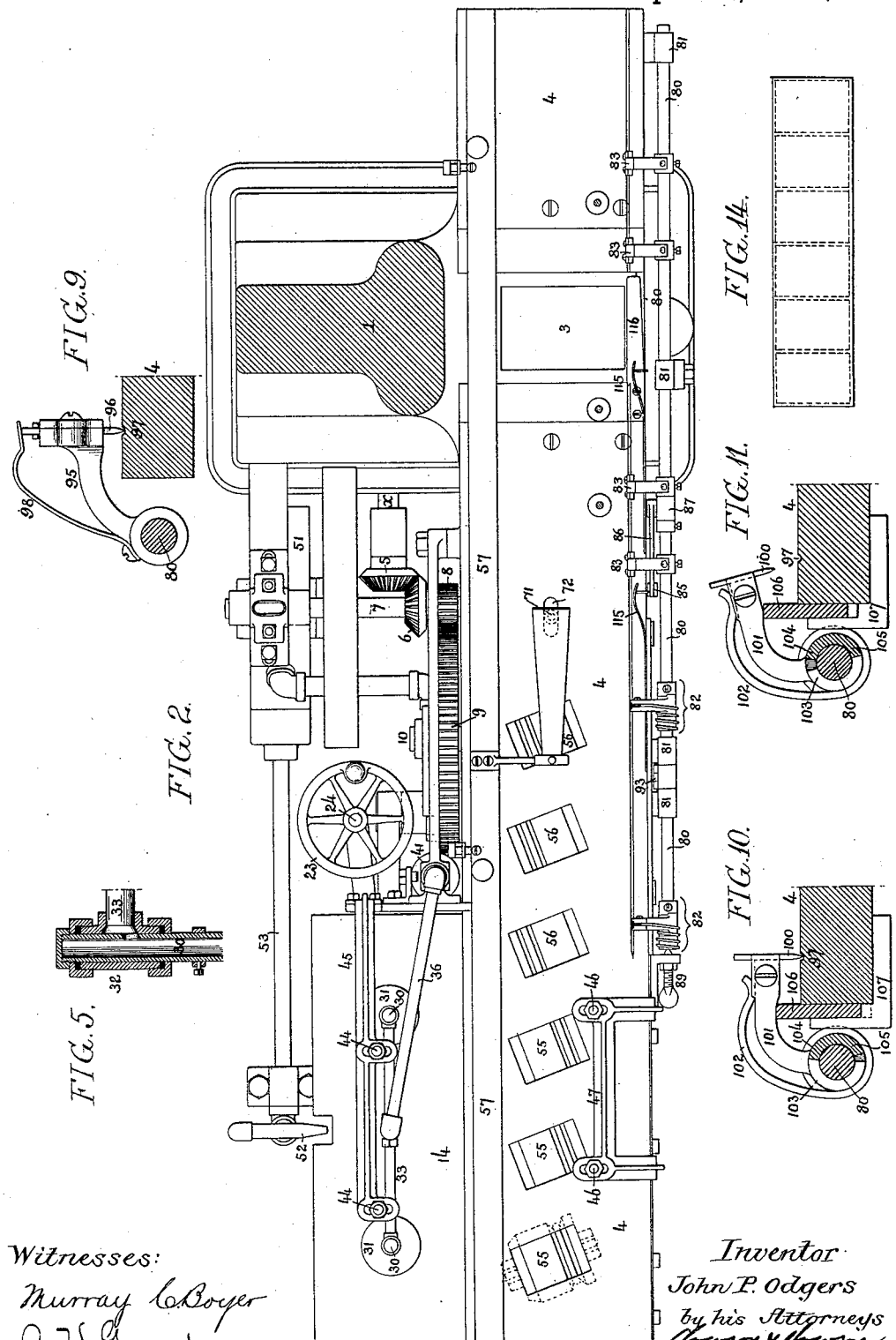

UNITED STATES PATENT OFFICE.

JOHN P. ODGERS, OF PHILADELPHIA, PENNSYLVANIA, ASSIGNOR TO THE A. M. COLLINS MANUFACTURING COMPANY, OF SAME PLACE.

FEEDING DEVICE FOR CARD-PUNCHING PRESSES.

SPECIFICATION forming part of Letters Patent No. 482,981, dated September 20, 1892.

Application filed July 24, 1891. Serial No. 400,547. (No model.)

*To all whom it may concern:*

Be it known that I, JOHN P. ODGERS, a citizen of the United States, and a resident of Philadelphia, Pennsylvania, have invented certain Improvements in Feeding Devices for Card-Punching Presses, of which the following is a specification.

The object of my invention is to provide automatic mechanism for feeding to a punching-machine strips of card-board or "card-blanks," from which the cards are punched by said machine, my invention comprising certain combinations of parts, which are fully described and specifically claimed hereinafter.

In the accompanying drawings, Figure 1 represents a front view of a punching-press with which my improved feeding mechanism is combined, said feeding mechanism being also shown in front view. Fig. 2 is a sectional plan view of the press with the feeding mechanism in top or plan view. Fig. 3 is a rear view of part of the feeding mechanism. Fig. 4 is a transverse section of part of the same; and Figs. 5 to 14, inclusive, are detached views, on a larger scale, illustrating special features of construction not shown with sufficient clearness in the other views of the drawings.

In Figs. 1 and 2, 1 represents a punching-press of any appropriate character, having a reciprocating punching-die 2 and a counter-die 3 in the bed. Forming a continuation of said bed of the press is a table 4, along which is fed the strip of card-board or card-blank from which the cards are to be punched by the action of the dies 2 and 3 of the press, the blank being of such length as to form a number of cards, as shown, for instance, in Fig. 14, in which the dotted lines represent the outlines of the cards to be punched from the blank.

The feeding devices comprise two essential parts: first, the mechanism for picking up blank after blank in succession from a pile and depositing said blanks in succession upon the feed-table, and, secondly, mechanism for feeding the blanks along said table to the punching-machine after they have been so deposited.

I will first describe the mechanism for picking up the blanks and depositing them upon the feed-table. One of the shafts $x$ of the punching-machine has at the end a bevel-wheel 5, (shown in Fig. 2,) and this bevel-wheel meshes with a bevel-pinion 6 upon a transverse shaft 7, which constitutes the main shaft of the feeding mechanism, and is geared by means of a spur-pinion 8 and spur-wheel 9 to a second transverse shaft 10 of said feeding mechanism. Adapted to suitable bearings at the rear of the machine is a screw-shaft 11, which engages with a nut 12 on a vertically-guided frame 13, having a table 14, upon which are mounted the blanks 15, from which the cards are to be cut, a gradual rising movement being imparted to this table 14 by intermittent rotative movements of the screw-shaft 11, which movements are imparted to said screw-shaft in the following manner: On the lower end of the shaft is a ratchet-wheel 16, with which engages a pawl 17 on a frame 18, hung to and free to vibrate on the lower end of the screw-shaft, movement of vibration being imparted to this frame from a cam 19 on the shaft 10 through the medium of a lever 20 and connecting-rod 21, as shown in Fig. 3, a spring 22 serving to keep the upper end of the lever 20 constantly in contact with the cam 19; or, in place of the ratchet-and-pawl mechanism, any suitable form of friction-clutching device may be employed for causing the rod 21 to impart intermittent rotative movement to the screw-shaft. Movement of said shaft independently of the devices described can also be effected by manipulating a hand-wheel 23 at the upper end of a shaft 24, which is mounted in bearings 25 on the frame, the lower end of said shaft 24 having a sprocket-wheel 26, with which engages a chain belt 27, the latter also engaging with a sprocket-wheel 28 at the lower end of the screw-shaft. Hence by manipulating the hand-wheel a quick elevation or depression of the table 14 and its load of blanks can be effected. The picking up of the blank from the pile and its transfer to the feeding-table 4 are effected by a vacuum lifter and carrier, which, as shown, consists of a pair of lift-tubes 30, provided at their lower ends with disks or flanges 31, said tubes being free to slide vertically to a limited extent in heads 32, Fig. 5, at the opposite ends of a cross-tube 33, which has at the center a valve-casing 34, the plug 35 of this valve depending from one end of a tubular arm 36, which is connected at its other end to a tubular vertical rock-shaft 37, adapted to and free to slide vertically in bearings 38 on the frame of the machine, rising movement being imparted to this rock-shaft 37 from the cam 19 through the medium of a lever 39, which acts upon a collar 40 on the shaft, as shown in Fig. 3, the weight of the shaft and its appurtenances causing its descent. On the shaft 37 is a grooved cam 41, with which engages a pin 42 on a bracket 43, secured to the frame of the machine, as also shown in Fig. 3, so that as the shaft 37 and the parts carried thereby approach and recede from the limit of their upward movement a lateral swinging movement will be imparted to the shaft and to the parts carried thereby. When at the limit of its outward swing the cross-tube 33, carried by the arm 36, strikes against stop-pins 44, depending from a frame 45, which overhangs the pile of blanks, so that said cross-tube is squared up into line with the blank beneath it, and when the arm 36 is at the limit of its inward swing the cross-tube 33 strikes against similar stop-pins 46, depending from a frame 47, secured to and projecting over the feed-table 4, so that the blank carried by the lifter will be brought into line with said table and will be delivered squarely onto the same. The pins 44 and 46 may therefore be termed "squaring devices" for the lifter. The lower end of the tubular rock-shaft 37 is in communication through a flexible tube 50, Fig. 3, with the inlet of an exhaust-fan 51, and when the arm 36 is at the limit of its outward swing and the cross-tube 33 is above the pile of blanks on the table 14 the plug 35 of the valve at the center of said cross-tube occupies the position shown in Fig. 6, so that the said tube is in communication with the tubular arm 36 and tubular shaft 37. Hence air is drawn into the lower ends of the lift-tubes 30 until the plates 31 of the same in their descent rest upon the top blank of the pile. The inlet of air being thus cut off, a partial vacuum is formed in the lift-tubes 30, so that when they rise they carry the top blank of the pile with them, easy separation of this blank from the rest of the pile being insured by a blast of air directed against the outer edges of the blanks close to the top of the pile from a nozzle 52, which is mounted upon the upper end of a pipe 53, the latter being in communication with the discharge-orifice of the fan 51. As the lifter swings inward over the feed-table 4 the plug 35 turns in the casing 34 until by the time the arm 36 reaches the limit of its inward swing, as shown by dotted lines in Fig. 4, the plug has turned to the position shown in Fig. 7 and the cross-tube 33 and lift-tubes 30 are cut off from communication with the arm 36. Hence as soon as the partial vacuum in the lift-tubes 30 and cross-tube 33 is broken the blank will drop from the lift-tubes onto the table 4. The vacuum is broken by the inlet of air into the cross-tube 33 through leakage-ports 39, formed in said cross-tube, as shown in Figs. 3, 6, and 7, these leakage-ports, however, not being of sufficient area to prevent the formation of the partial vacuum in the lift-tubes and cross-tube by the action of the fan 51 when the valve 35 is open, it being understood that said ports are open at all times. A single lift-tube or more than two lift-tubes may be used, if desired, the construction shown being preferred.

Having thus described the mechanism for lifting blank after blank from the pile and depositing it upon the feed-table 4, I will now describe the means for feeding the successive blanks forward over said table to the punching-press. Projecting through openings in the feed-table 4 are a series of feed-drums 55 and 56, the axes of all of which are slightly inclined in respect to the longitudinal line of the feed-table, so that the feed-drums not only direct the blanks forward, but also tend to force one edge of each blank against the guide-flange 57 at the inner side of the feed-table. There are in the present instance three feed-drums 55 and a like number of feed-drums 56, although more or less than this number may be used, if desired, and all of the drums are driven by belts 58 from pulleys 59 on a longitudinal shaft 60 beneath the feed-table, this shaft having another pulley 61, which receives a belt 62, adapted to a pulley 63 on the transverse shaft 7 of the machine. The shafts of the drums 55 are adapted to bearings on the under side of the feed-table 4; but the bearings for the shafts of the drums 56 are carried by a frame 64, suitably guided vertically in hangers 65 beneath the table, as shown in Fig. 8, this frame 64 resting upon cams 66, formed upon a cam-bar 67, which is free to reciprocate longitudinally in the lower ends of the hangers 65, movement of the bar in one direction being effected by a spring 68, acting on one end of the bar, as shown in Fig. 1, and movement in the other direction being effected by a lever 69, which is under the influence of a cam 70 on the transverse shaft 10 of the machine. (See Figs. 1 and 8.) Rising and falling movements are thus imparted to the frame 64 by reason of the cams 66 on the bar 67, and these movements are sufficient in extent to carry the peripheries of the feed-drums 56 above and below the surface of the feed-table 4, so that when they are up they will act upon the blank and feed it forward, but when they are depressed said blank will be freed from their feeding influence. Feed-rollers or, in fact, any continuously-moving feeding device cannot be relied upon for properly feeding the blanks to a punching-machine, as each blank has to be moved forward intermittently, so as to bring the successive portions of the same under the punch, and this intermittent forward movement must be of an exact and positive character, as the blanks are frequently printed upon before having the cards cut therefrom, and these printed impressions must always bear a definite relation to the punching-dies, so that they will appear in proper position upon the cards punched from the blank. The rollers 55 and 56 therefore serve to feed the successive blanks forward only until the front edge of each blank comes in contact with a stop-pin 71, projecting above the feed-table 4, as shown in Fig. 8, the drums 56 then descending and leaving the blank in position to be caught by the reciprocating feeding devices hereinafter described, the blank being fed forward intermittently by said devices on the withdrawal of the stop-pin 71. The withdrawal of said pin is effected simultaneously with the dropping of the feed-drums 56, the lower end of the pin 71 having a head 73, which is acted upon by a spring 74, tending to press said head into contact with a cam 75 on the reciprocating cam-bar 67, as shown in Fig. 8. The stop-pin 71 is guided in a sleeve which occupies a slot 72 in the feed-table 4, said sleeve being secured to or forming part of a plate 76, adjustably secured by nuts 76ª to the under side of the feed-table, (see Fig. 14,) so that the distance of the stop-pin from the punching-dies of the press can be accurately regulated to accord with the character of the blanks which are to be subjected to the action of the press. The reciprocating feeding devices for the blanks comprise a reciprocating shaft 80, suitably guided in bearings 81 on the frame of the machine and carrying two sets of nippers 82 and 83, reciprocating movement in one direction being imparted to the shaft by a cam 84 on the shaft 7, acting through the medium of a lever 85 and connecting-rod 86, hung to a collar 87 on said shaft 80, movement in the other direction being effected by a spring 88, acting upon the lever 85, and this movement being limited by contact of the end of the shaft 80 with a set-screw 89, carried by a bracket on the front of the feed-table, so that the point at which the nippers take hold of the blank to feed it forward can be accurately regulated in respect to the dies of the press. In addition to its reciprocating movement the shaft 80 has a rocking movement imparted to it by a cam 90 on the shaft 7, this cam acting through the medium of a lever 91, which is connected by a rod 92 to an arm 93 on the rock-shaft, as shown in Figs. 1 and 2, the lever 91 being held in contact with the cam 90 by means of a spring 94. Each feeding-nipper 83 consists of an arm 95, Fig. 9, secured to the shaft 80 and having a head in which is guided, so as to have a slight vertical movement, the nipping-blade 96, the lower edge of which works in a groove 97 in the feed-table 4, the upper projecting end of the nipper-blade being acted upon by a spring 98, which tends to depress it. The blade of each nipper 83 therefore acts upon the strip presented to it on each forward and downward movement of the nipper; but the nippers 82 cannot be constructed in this way; otherwise they would interfere with the feeding movements of the drums 56. Hence each of said nippers 82 is constructed as shown in Figs. 10 and 11—that is to say, its nipping-blade 100 is secured to an arm 101, which is loose on the shaft 80, but is acted on by a spring 102, tending to keep the shoulder 103 on the hub of the arm in contact with a shoulder 104 on a hub 105 on the shaft 80, so that while the arm 101 will always be lifted on the backward movement of the shaft 80 it need not necessarily follow the forward movement of the same, such movement of the arm being effected solely by the spring 102, so that the arm and its nipper-blade can be lifted out of action when desired—that is to say, during the time that the feed-drums 56 are elevated or in operative position. This lifting of the arms 101 is effected by a cam-slide 106, Figs. 12 and 13, said slide being guided longitudinally in bearings 107 at the front of the feed-table and being provided with cams 108, as shown, so that when the bar is moved forward these cams, riding on the bars 107, cause the slide 106 to rise, as shown in Fig. 13, so as to lift the nippers 100 out of operative position, as shown in Fig. 11, the nippers being held in this position until the feed-drums 56 have properly fed the blank forward against the stop-pin 71 and are about to be lowered with said stop-pin, so as to permit the farther forward feed of the blank, whereupon the slide 106 is retracted and drops, as shown in Fig. 12, so as to permit the nippers 100 to fall into operative position, as shown in Fig. 10. Reciprocating movement is imparted to the slide 106 from a cam 110 on the transverse shaft 10 of the machine, this cam acting upon a lever 111, which is held in contact with the cam by a spring 112 and is adapted at its upper end to a slot 113 in the cam-slide 106, as shown in Figs. 12 and 13. Spring-pressers 115 project over the forward edge of the feed-table 4, as shown in Fig. 2, so as to keep the blanks properly pressed against the guide-flange 57 after said blanks have passed beyond the influence of the feed-drums 56, and in order to prevent the sticking of the strip to the lower die of the press, so as to prevent the proper forward feed of the same by the nippers, I place in front of said lower die of the press a spring-lifter 116, as shown in Figs. 1 and 2, this lifter tending to free the cut edge of the strip, and thus insure its proper forward feed by the nippers.

The tubular lifter may, if desired, reciprocate instead of swinging, and the cut-off valve may be located at the junction of the arm 36 and tubular shaft 37 in some cases, the arm in such cases swinging on the shaft.

Having thus described my invention, I claim and desire to secure by Letters Patent—

1. The combination of the tubular lifter, the arm to which said lifter is pivoted, means for raising and lowering and for swinging said arm, an air-exhausting device, and a valve located at the pivot-point of the arm and lifter, so as to be opened and closed as the arm swings, substantially as specified.

2. The combination of the tubular lifter, the swinging arm carrying the same, the exhausting device, and the valve at the junction of the arm and lifter, with a squaring device for the lifter at each end of its swing, substantially as specified.

3. The combination of the tubular lifter, the swinging arm, the exhausting device, the automatic cut-off valve, and leakage-ports in said lifter for permitting the card to drop when communication with the exhauster is closed, substantially as specified.

4. The combination of the tubular lifter, the swinging arm, the tubular shaft carrying the same, the exhaust mechanism communicating with said shaft, a grooved cam and engaging-pin, and means for raising and lowering the shaft, whereby said cam and pin cause a partial turning of the same, substantially as specified.

5. The combination of a punching-press with blank-feeding mechanism comprising feed-drums, a movable stop-pin for arresting the forward movement of the blank under the action of the drums, and reciprocating nippers for seizing the arrested blank and carrying it farther forward, substantially as specified.

6. The combination of the feed-drums and stop-pin movable into and out of operative position with reciprocating nippers likewise movable into and out of operative position, substantially as specified.

7. The combination, in card-blank-feeding mechanism, of feed-drums, some of which are fixed and others in advance of the same, movable into and out of operative position, a movable stop-pin for the blank, and reciprocating nippers for engaging the blank and feeding it forward beyond the drums, substantially as specified.

8. The combination, in card-blank-feeding mechanism, of a set of feed-drums, a frame carrying the latter, a cam-bar for causing said frame to rise and fall, and means for reciprocating said cam-bar, substantially as specified.

9. The combination, in card-blank-feeding mechanism, of a set of feed-drums, a stop-pin, a frame carrying said drums, a cam-bar acting on said frame and on the pin, and means for operating said cam-bar, substantially as specified.

10. The combination, in card-blank-feeding mechanism, of a set of feed-drums and a stop-pin movable into and out of operative position, a set of swinging and reciprocating nippers, a cam-slide for acting on said nippers to hold them out of operative position, and means for operating said cam-slide, substantially as specified.

In testimony whereof I have signed my name to this specification in the presence of two subscribing witnesses.

JOHN P. ODGERS.

Witnesses:
EUGENE ELTERICH,
HARRY SMITH.